United States Patent
Aiyama

Patent Number: 5,493,784
Date of Patent: Feb. 27, 1996

[54] BLADE COVER FOR CUTTING MACHINE

[75] Inventor: Fumihiko Aiyama, Tokyo, Japan

[73] Assignee: Kioritz Corporation, Tokyo, Japan

[21] Appl. No.: 357,527

[22] Filed: Dec. 16, 1994

Related U.S. Application Data

[63] Continuation of Ser. No. 152,824, Nov. 15, 1993, abandoned.

[30] Foreign Application Priority Data

Nov. 20, 1992 [JP] Japan .................. 4-086311 U

[51] Int. Cl.$^6$ .................................................. A01D 34/68
[52] U.S. Cl. ................................................ 30/276; 30/347
[58] Field of Search ........................................ 30/276, 347

[56] References Cited

U.S. PATENT DOCUMENTS 4,756,084  7/1988  Morita ........................ 30/286 X
4,864,728  9/1989  Kloft et al. .................. 30/276
5,107,665  4/1992  Wright ........................ 30/276

FOREIGN PATENT DOCUMENTS 2572247  1/1989  France .
61-148128  9/1986  Japan .

Primary Examiner—Douglas D. Watts
Attorney, Agent, or Firm—Bauer & Schaffer

[57] ABSTRACT

A blade cover for a rotary blade weed or grass cutter is formed with a body adjustably fixed to a bracket provided on the operating shaft. Either the bracket or the attachment part is provided with long holes extending slantingly downwards to the main body and bolts are inserted into these long holes and fastened so that the position of the attachment part on the bracket is changeable.

2 Claims, 7 Drawing Sheets

BLADE COVER FOR CUTTING MACHINE

This is a continuation of Ser. No. 08/152,824, filed Nov. 15, 1993 now abandoned.

FIELD OF THE INVENTION

This invention relates to a weed and grass cutter and, in particular, to a cover device for the rotary cutting blade in order to protect the operator.

Weed and grass cutting machines are provided with a rotary cutting blade mounted at the tip of a drive rod, which rod is housed in an operating shaft used by the operator to move the cutting blade up and down and swinging it to the right and left as required. The rotary cutting blade—that is, the operator side of the rotary blade, is commonly covered to protect the operator from the blade.

The blade cover is ordinarily fixed at a pre-selected position by many bolts to a bracket provided on the operating shaft. However, since such weed and grass cutters are provided with cutting blades of different types, which may be exchanged in order to efficiently carry out cutting work according to the specific vegetation to be cut, the working site and the like, the conventional mounting of the cover has disadvantages.

In the different cutting blades available, the length of the blade (i.e., from the center of the blade fixed to the tip of the drive rod to the outer edge of the blade) is not always the same. Therefore, in order to change the cutting blade, the blade cover protecting the operator must also be changed to another type of blade cover with sufficient width to cover the newly attached blade.

As shown in FIG. 7, for example, although a small size blade cover having a short radius, as shown by the letter A, may suffice when a disk type metal blade 3 is used, the blade cover must be changed to one having a bigger radius, as shown by the letter B, when a nylon cord type blade 35 is substituted.

However, changing of the blade cover is time consuming since the blade cover is fixed on said bracket by many bolts. Secondly, many parts were needed since different types of the blade covers and their fittings must be made available. The storage of so many parts is quite inconvenient.

SUMMARY OF THE INVENTION

The present invention is made to overcome the aforementioned situation, and its object is to provide a blade cover which does not have to be exchanged with another type of blade cover, even though the cutting blade is changed.

In order to implement the above object, the present invention comprises a cover having an attachment part extending slantingly upwards so as to be slidably fixed to a bracket provided on the operating shaft of the cutting machine. At least one long hole extending downwardly toward the back of the cover is provided in the bracket and/or the attachment part, and a bolt is inserted into the hole to adjustably secure the attachment part relative to the bracket.

According to the present invention, the position of the cover relative to the bracket is properly adjustable slantingly downwards from the central operating rod—that is, after loosing the bolt, the attachment part can slide slantingly downwards alongside the long hole so as to change the position of the rear end of the cover. Then the attachment part and the cover can be fixed at appropriate position by tightening the bolt again.

Therefore, it is not necessary to change the blade cover every time another blade is substituted. Moreover, the adjustment of the position of the cover can be performed in a simple manner since it is achieved only by loosing the bolt and tightening it again.

DETAILED DESCRIPTION OF THE INVENTION

Figure 1:
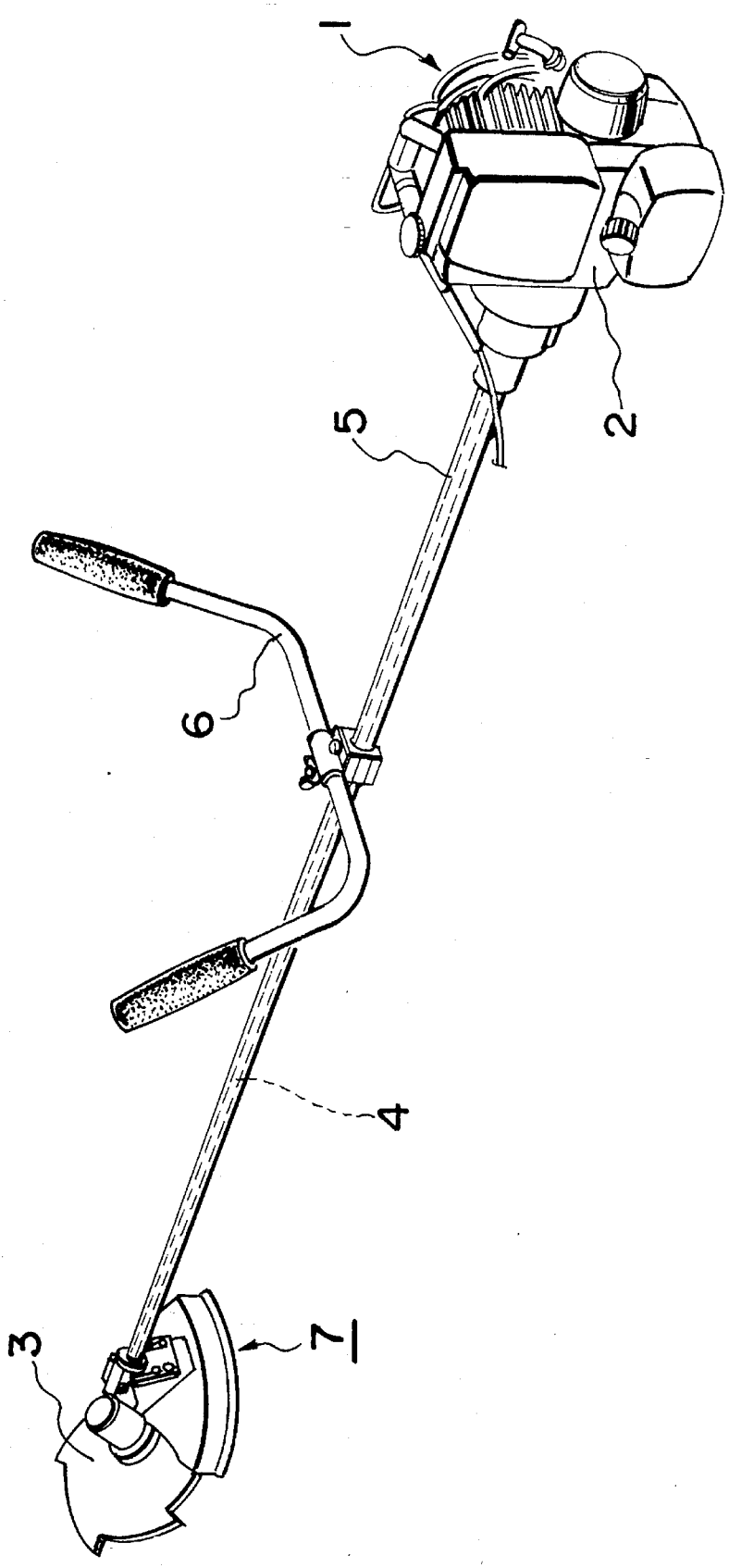
FIG. 1 is a perspective view of the entire cutting machine, showing a blade cover according to one embodiment of the present invention.
Figure 2:
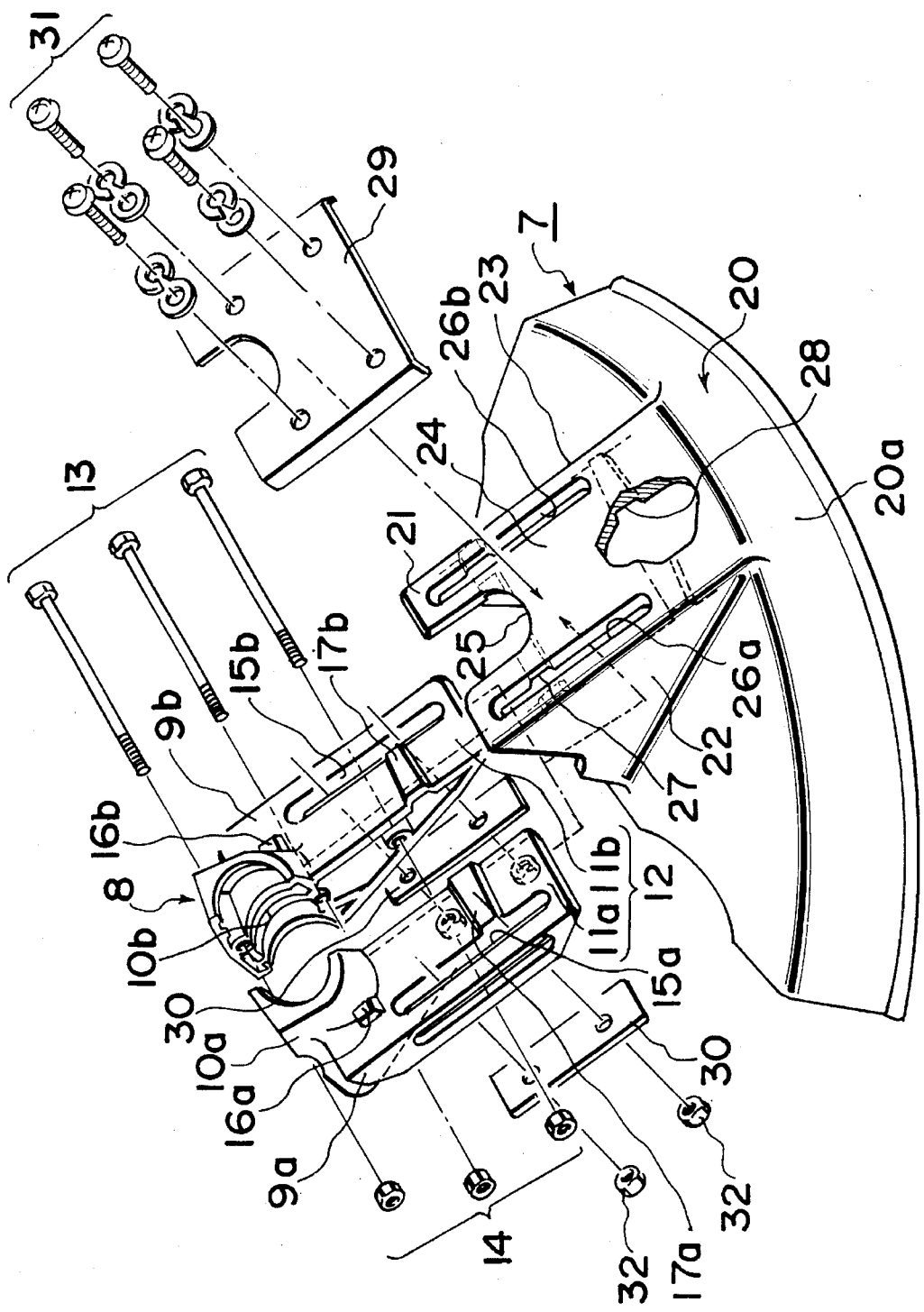
FIG. 2 is an exploded perspective view of the blade cover according to the embodiment shown in FIG. 1.

In FIG. 1 the engine, depicted by the numeral 1, includes a motor 2 such as an air-cooled two-cycle gasoline engine and a disk type cutting blade 3 rotated by the rotary driving force of the motor 2 transmitted through drive rod 4, housed in an operating shaft 5 comprising a light metal pipe at the upper end of which is mounted an operating handle 6.

In order to carry out weed or grass cutting, the operator hangs the engine 1 on his shoulder by a belt (not shown in the drawing) and causes the cutting blade 3 to rotate while swinging the end of the operating rod 5 right and left by the operating handle 6.

A blade cover 7 according to the present invention is provided to protect the operator's feet from the cutting blade 3 as well as to prevent cut weeds and the like from scattering in the direction of the operator.

As seen in FIGS. 2 to 6, the blade cover 7 is fixed on the tip of the operating shaft 5 through a bracket assembly 8, which comprises two bracket pieces 9a and 9b divided right and left as seen from above. Both of these bracket pieces 9a and 9b comprise operating rod holding collar halves 10a and 10b formed at the front thereof and blade cover supporting fittings 11a and 11b formed at the rear.

Each of the collar halves 10a and 10b is formed in a semicircle so as to fit to each half of the operating shaft 5. On the other hand, each of the blade cover fittings 11a and 11b is plate-like, extending backwards from the respective collar halves 10a and 10b, slantingly downwards. The fittings 11a and 11b together comprise a blade cover support 12 to which the blade cover 7 is adjustably connected.

Each of the right and left bracket pieces 9a and 9b is placed on the operating shaft 5 so as to pinch the operating shaft 5 between the collar halves 10a and 10b and are connected to each other using appropriate removable fasteners such as bolts 13 and nuts 14.

Each of the fittings 11a and 11b is provided with a long slot or hole 15a and 15b, respectively extending parallel to each other in the direction of extension of the bracket pieces 9a and 9b. These long holes 15a and 15b are provided so as to permit the slidable adjustment of the blade cover 7 on the thus formed cover support 12.

Further, on the upper surface of each of the fittings 11a and 11b convex ridges or detents 16a, 17a, 16, and 17b are formed, extending right to left or left to right at two positions spaced from each other. In the embodiment shown in the drawings, the upper convex parts 16a and 16b are provided at the side of each of the collar halves 10a and 10b.

On the other hand, the cutting blade cover 7 comprises a body 20 shaped to enclose the rear and the upper part of the cutting blade 3. The body 20 is provided with an upwardly slanting attachment bracket 21, having triangular right and left side walls 22 and 23, parallel to each other and an upper slanting surface 24 connecting these side walls 22 and 23. The front edge of the upper slanting surface 24 is provided with a cutout 25 of U-shape, allowing it to fit about the collar halves 10a and 10b when attached to the bracket assembly 8. The upper slanting surface 24 is also provided with long holes 26a and 26b at the same distance between the right and left edges as those of the long holes 15a and 15b formed in the fittings 11a and 11b. The underside of the upper slanting surface 24 is provided with concave recesses 27 and 28 at positions corresponding to and so as to fit with each convex parts 16a, 17a, 16b and 17b when the cover is fixed at the deepest position to the bracket assembly 8. These concave recesses 27 and 28 fit to the convex parts 16a, 17a, 16b and 17b so as to prevent slipping downwardly of the blade cover 7 during the operation of the machine.

The cover body 20 fans out on both sides from the attachment bracket 21 when viewed from above and has a depending skirt 20a extending about its rear edge to enclose the rear of the cutting blade 3.

The blade cover 7, constructed as aforementioned, is attached to the cutting machine by placing the attachment bracket 21 onto the blade cover support 12 of the bracket assembly 8 so that the right and left positions of the long holes 15a and 15b provided in the upper slanting surface 24 coincide with the right and left position of the long holes 26a and 26b provided in the support 12. A washer plate 29 is placed on the upper slanting surface 24, while washer plates 30 are placed beneath the blade cover support 12. The blade cover 7 is then placed on support 12 below the washer plate 29, and bolts 31 are inserted into each right and left long holes 26a (15a) and 26b (15b) overlapping each other. By screwing each bolt 31 into a nut 32 from the under side surface of the blade cover support 12, cover 77 is fixed to the bracket assembly 8.

Since the bolts 31 are inserted into the overlapped long holes 26a (15a) and 26b (15b) provided in each of the blade cover supports 12, the attachment bracket 21 of the blade cover 7 and thus the blade cover 7 itself can be moved up and down alongside the bracket 8 when the bolts 31 are loosened but not removed.

Figure 3:
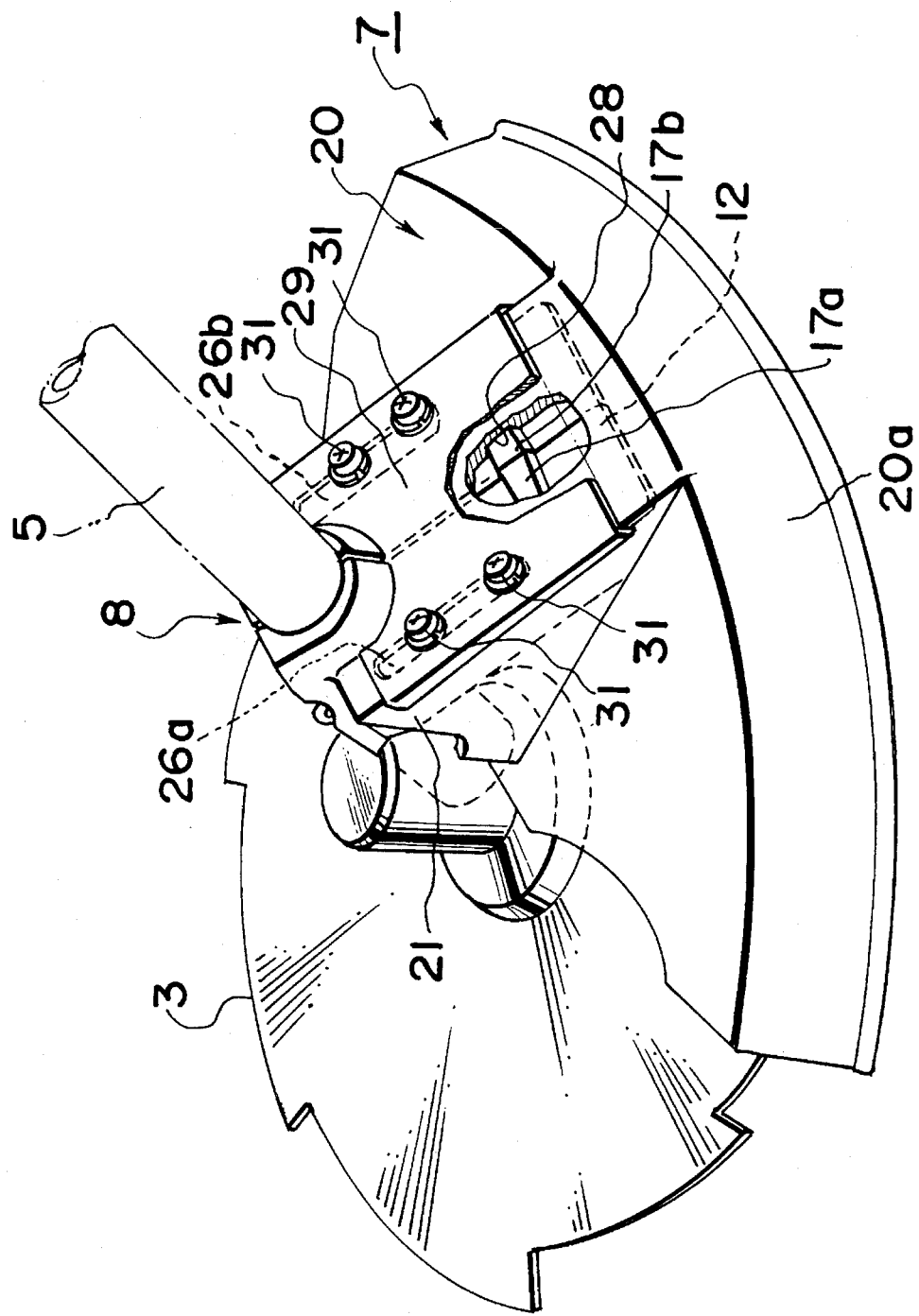
FIG. 3 is a perspective view of the blade cover shown in FIGS. 1 and 2 fixed at the deepest position of the bracket.
Figure 5:
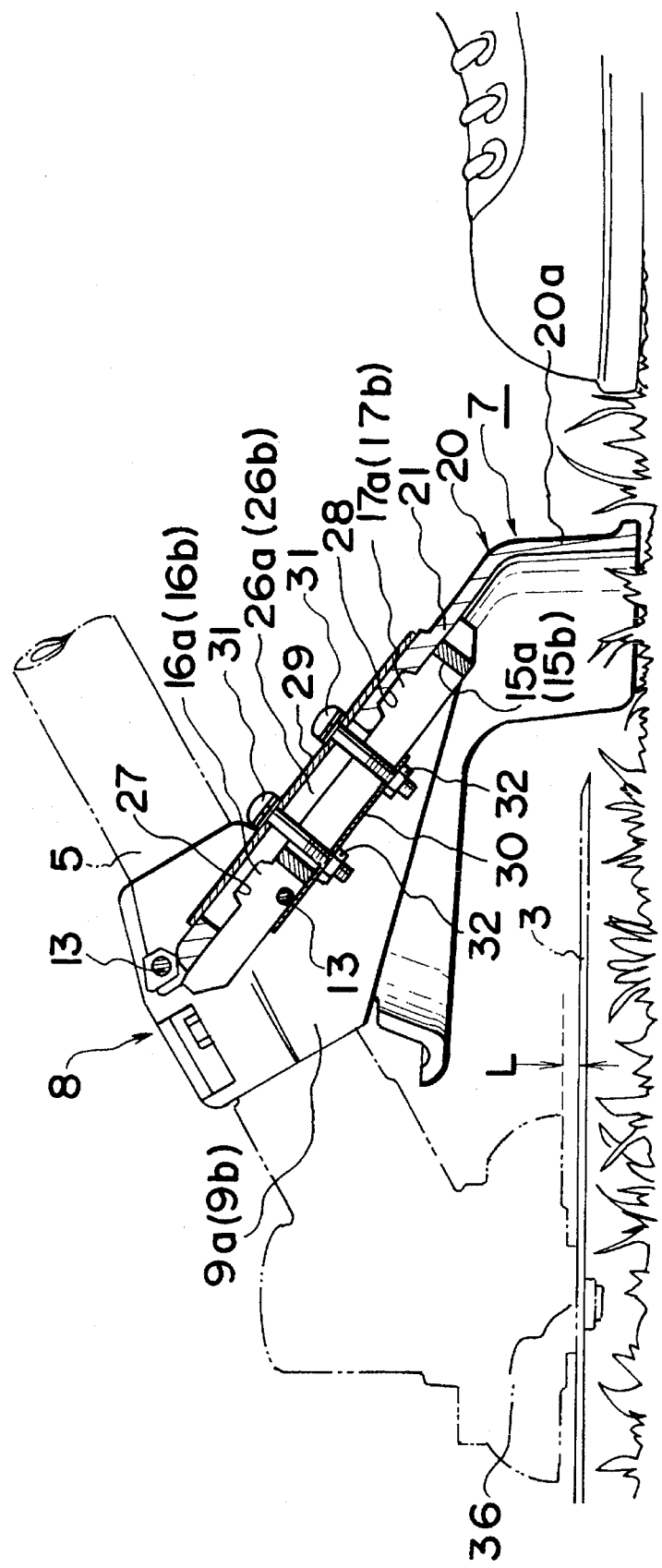
FIG. 5 is a vertical sectional view showing the blade cover fixed at the deepest position of the bracket as shown in FIG. 3.

Therefore, as shown in FIGS. 3 and 5, when a cutting blade 3 is used, which has short distance (L) from the point 36 at which it is fixed to the tip of the operating rod 5 (such as a rotary disk blade), the blade cover 7 may be attached deeper into the bracket 8, sliding the cover 7 fully over the bracket 8. The cover 7 is then fixed using the bolts 31 and the nuts 32. FIG. 5 shows the situation where the upper convex parts 16a and 16b of the bracket 8 fit with the upper concave part 27 and the lower convex parts 17a and 17b of the bracket 8 fit within the lower convex part 28.

Figure 4:
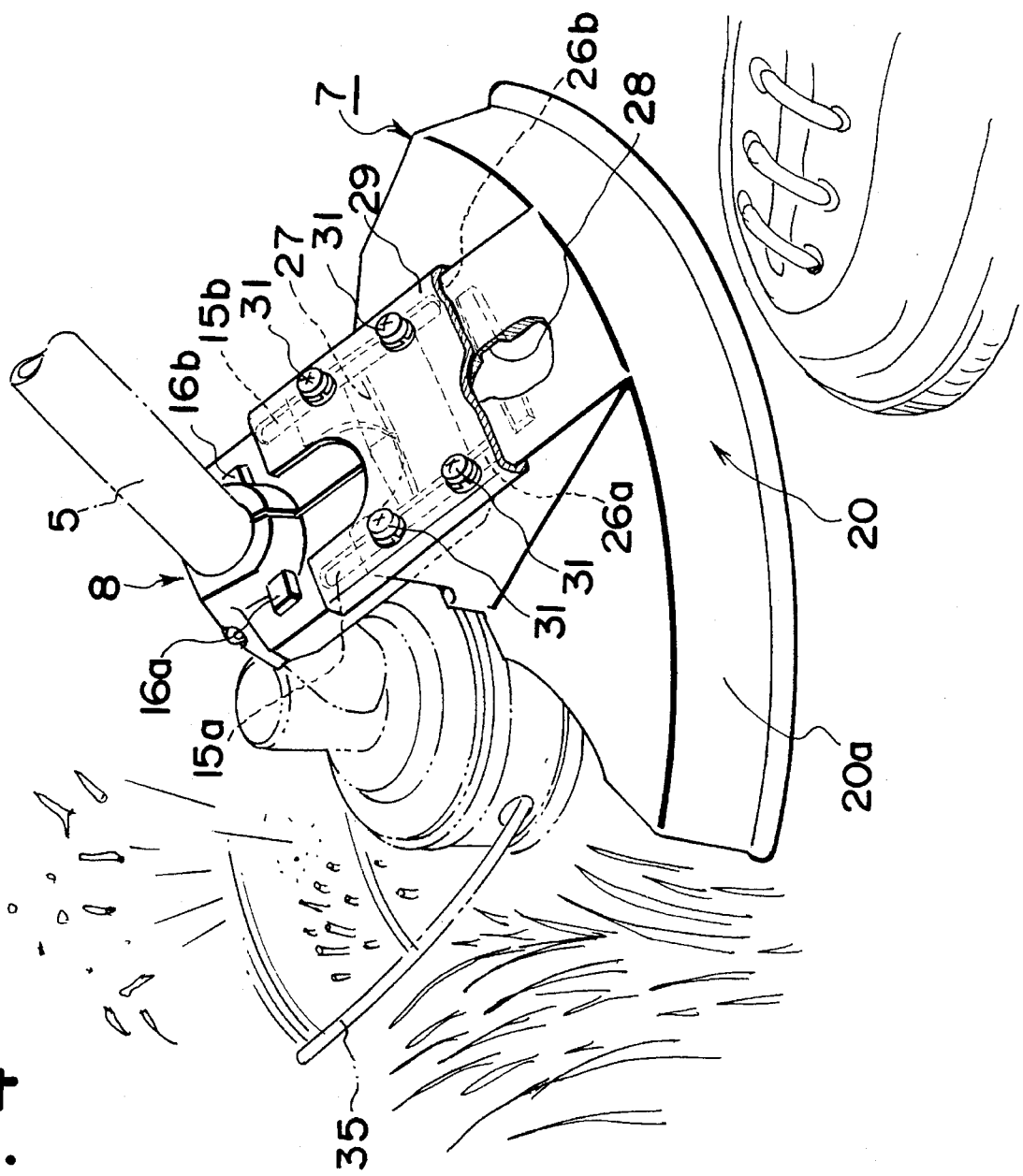
FIG. 4 is a partial sectional perspective view of the blade cover shown in FIGS. 1 and 2 fixed at the shallow position of the bracket.
Figure 6:
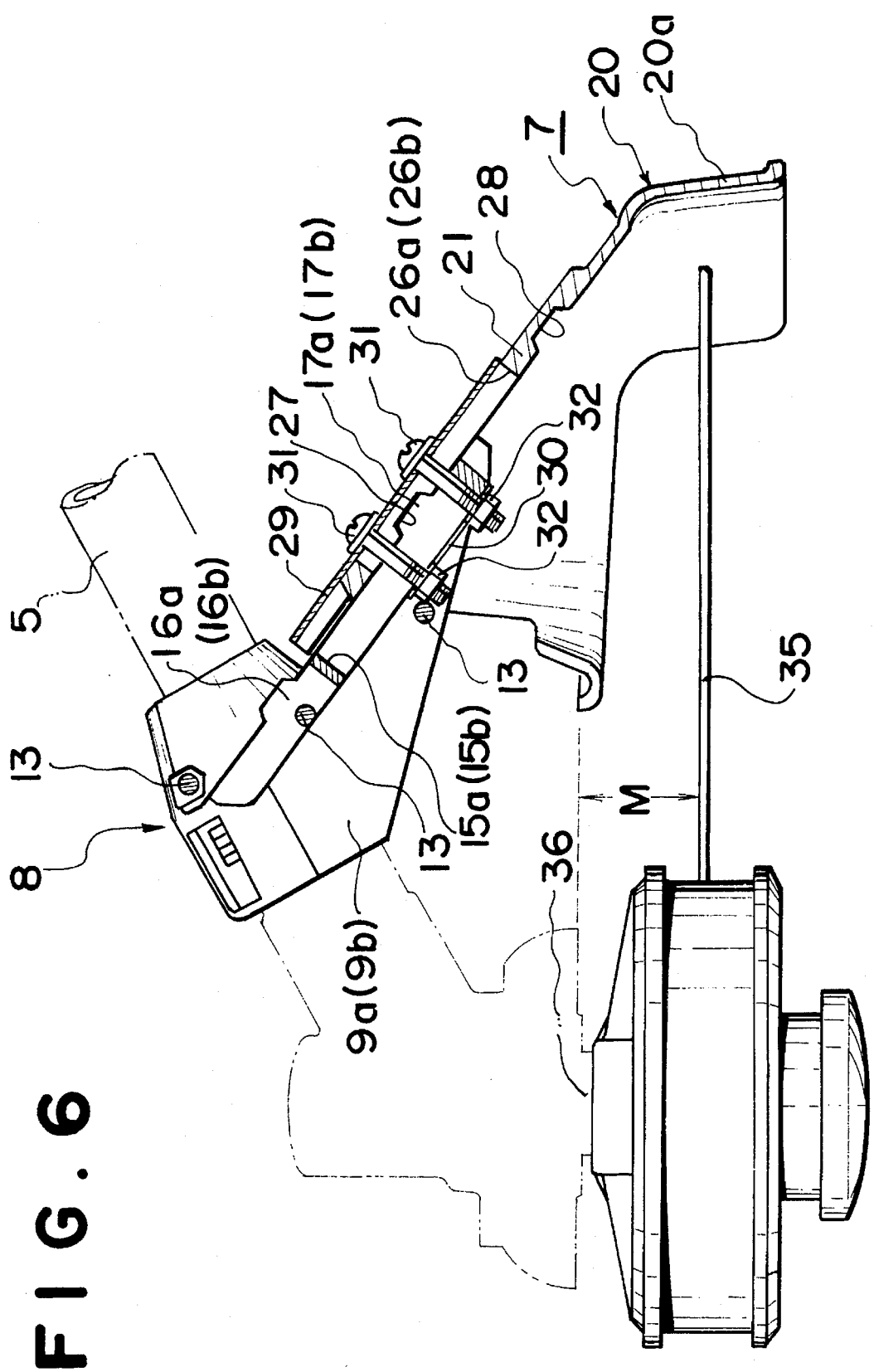
FIG. 6 is a vertical sectional view showing the blade cover fixed at the shallow position of the bracket as shown in FIG. 4.
Figure 7:
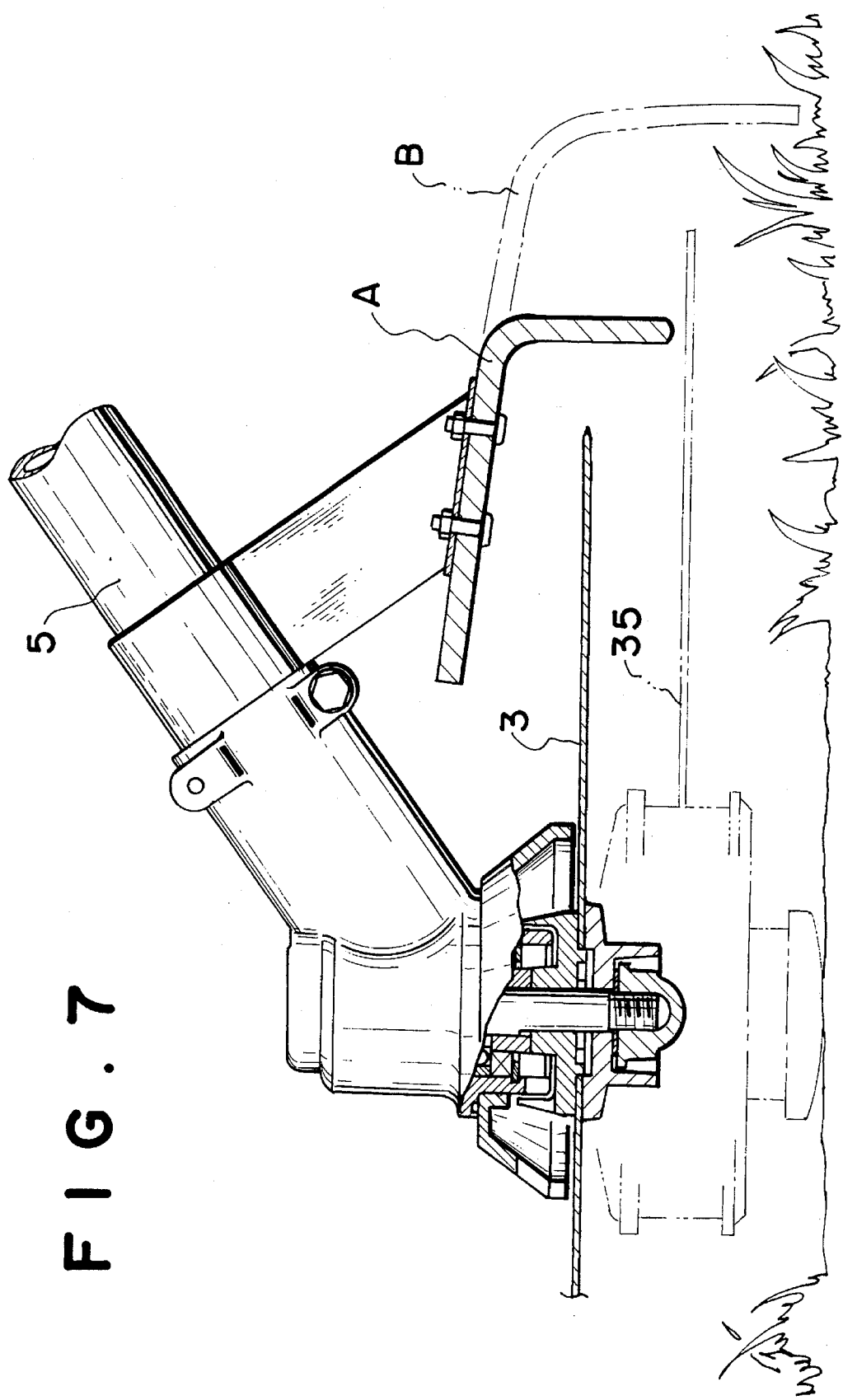
FIG. 7 is a vertical sectional view showing a prior art.

On the other hand, as shown in FIGS. 4 and 6, when the cutting blade 35 has a longer distance (M), such as when a nylon cord blade is used, the cover 7 is slidingly extended downward so as to be attached to the bracket 8 in shallow position and then fixed using the bolts 31 and the nuts 32. FIG. 6 shows the situation that the lower convex parts 17a and 17b of the bracket 8 are fit with the upper concave part 27 in this position.

The cutting blade 35 shown in FIG. 6 comprises a flexible filament such as nylon cord, but detailed description thereof is omitted since it is not relevant to an understanding of the present invention.

As aforementioned, the blade cover 7 according to the embodiment of the present invention allows adjustment in the height of the skirt 20a of the cover body 20 as well as allowing adjustment of the acceptable rotation radius of the cutting blade. Therefore, only one cover is required for the various types of cutting blades having different height and radius. Thus, the number of parts required for the cutting machine can be minimized.

The adjusted fixed position can be changed simply by loosing the bolts 31 to such extent as the concave part 27 and 28 of the blade cover 7 is merely released from the convex part 16 and 17 so as to permit sliding of the attachment bracket 21 upwards or downwards relative to the bracket assembly. Because it is not necessary to completely remove bolts 31, the adjustment can be performed easily and without worry about loss of parts during the adjustment.

As described above, one embodiment of the present invention was explained where long holes are provided in both bracket and blade cover in order to expand the size of the adjustment of the blade cover and where the position of the cover relative to the bracket assembly is changed by sliding these long holes upwards or downwards relative to each other. The long holes, however, may be provided in only one of either the bracket or blade cover, and the fastener mounted on the other.

In the drawings of this embodiment, each of the concave and convex parts is provided at two positions on the blade cover and the bracket, but they are not limited thereto.

What is claimed is:

1. A protective cover assembly for an operator carried grass or vegetation trimming device having a motor mounted on an elongated carrying rod and a rotary blade mounted on the tip of said rod at an angle to said rod so as to be driven in a fixed cutting plane away from the operator, said protective cover assembly comprising a fan shaped body having an upper wall and a depending skirt along the peripheral curved edge of the upper wall, means extending at an angle from the upper wall for attaching said body to said carrying rod so that the upper wall overlies at least a portion of said blade in a plane parallel to the cutting plane, and said depending skirt encloses the edge of said blade facing the operator, said attachment means comprising a first bracket member fixed with respect to said carrying rod and a second bracket member fixed with respect to said body, said first and second bracket members being slidably interchangeable and having means fixing said brackets at selected interengaging positions for selectively changing the position of said body relative to the cutting plane while maintaining said upper wall parallel to the cutting plane and said depending skirt enclosing the edge of the blade to thereby accommodate blades of varying configuration.

2. The assembly according to claim 1, wherein said means for fixing the brackets comprises a slot formed in at least one of said bracket members and bolt means extending through said slot securing said brackets together.

* * * * *